June 22, 1954  A. G. FLANSAAS  2,681,538
CUTTING BAR HEIGHT MEASURING INSTRUMENT
Filed Feb. 14, 1951

Albert G. Flansaas
INVENTOR.

BY *[signatures]*
Attorneys

Patented June 22, 1954

2,681,538

UNITED STATES PATENT OFFICE 2,681,538

CUTTING BAR HEIGHT MEASURING INSTRUMENT

Albert G. Flansaas, Loring, Mont.

Application February 14, 1951, Serial No. 210,820

1 Claim. (Cl. 56—23)

This invention relates to new and useful improvements in depth gauges and the primary object of the present invention is to provide a device for determining the height of a cutter bar of an agricultural machine.

Another important object of the present invention is to provide a cutting bar height measuring instrument that is quickly and readily applied to the conventional cutter bar support of a farm implement to be raised and lowered with the support to indicate the height of the cutter bar.

A further object of the present invention is to provide a cutting bar height measuring instrument that may be conveniently observed by the operator of the machine to which an adjustable cutter bar support is applied without interfering with the normal structure of the machine.

A still further aim of the present invention is to provide a device of the aforementioned character that is extremely simple and practical in construction, inexpensive to manufacture and install, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
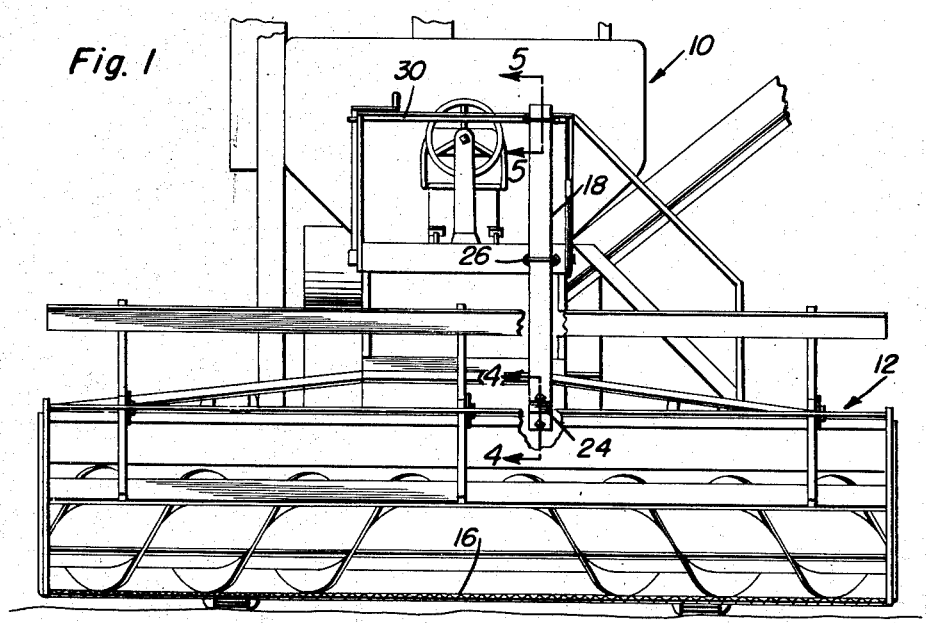
Figure 1 is a front elevational view of an agricultural machine and showing the present invention applied thereto.

Referring now to the drawings in detail, wherein, for the purpose of illustration, there is disclosed a preferred embodiment of the present invention, the numeral 10 represents a conventional and well known agricultural machine including a cutter bar support 12 that is operatively connected to the lift mechanism 14 of the machine whereby the cutter bar 16 may be selectively raised or lowered.

The present invention does not attempt to claim the foregoing well known machine but is merely an attachment therefor whereby the height of the cutter bar 16 may be readily and conveniently determined. Furthermore, the present invention is not to be limited to that type of machine shown, inasmuch as the invention is adaptable to any agricultural machine having a cutting object, either over or under ground, whose height is adjusted by touch controls.

Figure 3:
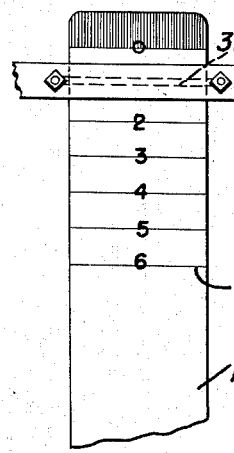
Figure 3 is an enlarged sectional view taken substantially on the plane of section line 3—3 of Figure 2.
Figure 2:
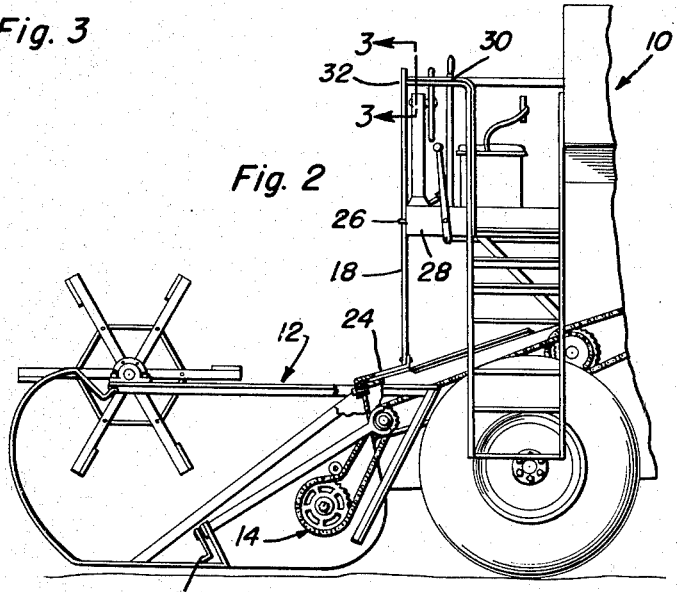
Figure 2 is a fragmentary side elevational view of Figure 1.
Figure 4:
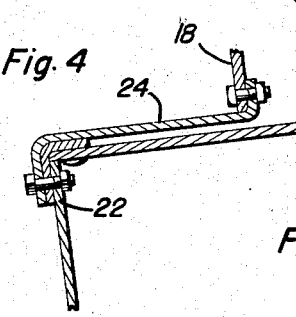
Figure 4 is an enlarged detail vertical sectional view taken substantially on the plane of section line 4—4 of Figure 1.
Figure 5:
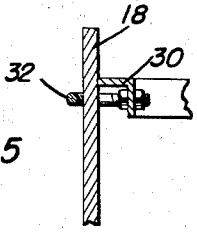
Figure 5 is an enlarged detail vertical sectional view taken substantially on the plane of section line 5—5 of Figure 1.

To accomplish the desired results, there is provided an elongated ruler or graduated bar 18 having a plurality of spaced parallel horizontal lines 20 with indicia, such as numerals, on the lines as shown in Figure 3. The lower end of the bar 18 is detachably secured to the rear wall or portion 22 of the support 12 by a bracket 24.

A U-shaped lower guide 26 is detachably secured to the operator's platform 28 of the machine 10 and slidably receives the upstanding bar 18. The railing 30 of the platform 28 supports an upper, removable, U-shaped guide 32 that also slidably receives the bar 18. The upper flat surface of the railing 30 will register with a selected line 20 to indicate to the machine operator the height of the cutter bar as the bar 18 will be raised or lowered with the support 12.

Having described the invention, what is claimed as new is:

In an agricultural machine including a lift mechanism and a cutting edge support attached to the lift mechanism and having a rear wall, a vertically disposed ruler, a substantially Z-shaped bracket having a depending flange secured to said rear wall and an upstanding flange secured to the lower end of the ruler, said machine having an operator's platform and a guard railing therefor, a lower guide secured to the platform slidably receiving said ruler, said railing having an upper flat surface forming an index means for the graduations on said ruler.

References Cited in the file of this patent

UNITED STATES PATENTS

| Number | Name | Date |
|---|---|---|
| 357,880 | Walsh | Feb. 15, 1887 |
| 1,501,621 | Ronning et al. | July 15, 1924 |
| 2,170,573 | Pierson | Aug. 22, 1939 |
| 2,292,958 | Millard et al. | Aug. 11, 1942 |
| 2,318,409 | Millard et al. | May 4, 1943 |
| 2,528,041 | Davis | Oct. 31, 1950 |